United States Patent
Knipp et al.

(10) Patent No.: US 11,672,210 B2
(45) Date of Patent: *Jun. 13, 2023

(54) STUMP GRINDER WITH LATERALLY OFFSET GRINDING ARM OPERATED BY SINGLE JOYSTICK

(71) Applicant: The Toro Company, Bloomington, MN (US)

(72) Inventors: Joseph C. Knipp, Elko, MN (US); Christopher J. Kost, North Mankato, MN (US); David A. Murray, Eagan, MN (US); Landon M. Aldinger, Iowa Falls, IA (US); John P. Azure, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,650

(22) Filed: Aug. 20, 2021

(65) Prior Publication Data

US 2021/0378188 A1    Dec. 9, 2021

Related U.S. Application Data

(60) Continuation of application No. 16/406,661, filed on May 8, 2019, now Pat. No. 11,109,542, which is a
(Continued)

(51) Int. Cl.
    *A01G 23/06*   (2006.01)
(52) U.S. Cl.
    CPC ........... *A01G 23/067* (2013.01); *A01G 23/06* (2013.01)

(58) Field of Classification Search
    CPC .............................. A01G 23/06; A01G 23/067
    See application file for complete search history.

(56) References Cited

U.S. PATENT DOCUMENTS

| | | | | |
|---|---|---|---|---|
| 3,870,161 A | * | 3/1975 | Cording | G05G 9/047 |
| | | | | 212/289 |
| 5,638,619 A | * | 6/1997 | Bowling | B27G 21/00 |
| | | | | 83/DIG. 1 |

(Continued)

OTHER PUBLICATIONS

The Toro Company, STX-26 Stump Grinder Operator's Manual, dated 2012 (Year: 2012).*

(Continued)

*Primary Examiner* — Matthew Katcoff
(74) *Attorney, Agent, or Firm* — Merchant & Gould P.C.

(57) ABSTRACT

A stump grinder has a grinding arm that durably mounts a rotatable grinding wheel by securing the drive shaft of a motor to the grinding wheel such that a pair of bearings within the motor support one side of the grinding wheel and by supporting the other side of the grinding wheel with a stub shaft received within a third bearing. The grinding arm is laterally offset on the frame of the stump grinder to have a swing angle that is not symmetrical relative to the width of the frame, but with the swing angle starting at one side of the frame and then traversing across substantially the entire width of the frame to improve the ability of the operator to see the grinding wheel. A single joystick is movable in orthogonal directions corresponding to desired up and down and side-to-side pivoting motions of the grinding arm. The joystick includes a depressible trigger for starting and stopping the operation of the grinding wheel.

13 Claims, 7 Drawing Sheets

Related U.S. Application Data continuation of application No. 14/847,477, filed on Sep. 8, 2015, now Pat. No. 10,292,341, which is a division of application No. 12/987,797, filed on Jan. 10, 2011, now Pat. No. 9,462,759.

(56) References Cited

U.S. PATENT DOCUMENTS

| | | | | |
|---|---|---|---|---|
| 6,026,871 | A * | 2/2000 | Chapman | A01G 23/067 173/28 |
| 6,047,749 | A * | 4/2000 | Lamb | A01G 23/067 144/334 |
| 7,334,658 | B2 * | 2/2008 | Berg | E02F 9/2004 180/333 |
| 7,401,542 | B2 * | 7/2008 | Stephens | E02F 9/2203 91/525 |
| 10,117,388 | B2 * | 11/2018 | Azure | A01G 23/067 |
| 10,993,389 | B2 * | 5/2021 | Azure | A01G 23/067 |
| 11,109,542 | B2 * | 9/2021 | Knipp | A01G 23/06 |
| 2006/0255193 | A1 * | 11/2006 | Hoekstra | A01G 23/067 241/28 |

OTHER PUBLICATIONS

Vermeer Corporation, Vermeer Stump Cutter SC90/SC130 brochure, dated 2003 (Year: 2003).*

Rayco Manufacturing, Inc., "RG1645 Stump Cutter Brochure", dated 2008 (Year: 2008).*

\* cited by examiner

STUMP GRINDER WITH LATERALLY OFFSET GRINDING ARM OPERATED BY SINGLE JOYSTICK

TECHNICAL FIELD

This invention relates generally to the field of stump grinding in which a powered grinding wheel is used to grind or comminute a stump or other wood debris into a pile of wood chips or particles.

BACKGROUND OF THE INVENTION

Stump grinders are well known devices that employ a pivotal grinding arm that carries a rotatable grinding wheel at its outer end. The grinding wheel extends generally vertically and has powered rotation about a substantially horizontal axis of rotation. The pivotal grinding arm is pivotal on a support frame in an up and down motion about a substantially horizontal axis. In addition, the grinding arm is also pivotal in a side-to-side motion about a substantially vertical axis in many stump grinders.

When the grinding wheel is placed into operation and is rotating in a vertical plane about its substantially horizontal axis of rotation, the operator can pivot the grinding arm up and down and from side-to-side. This causes the grinding wheel to bite into and traverse over the stump or other wood debris that is to be grinded into particles. As repeated passes of the grinding arm and grinding wheel are made relative to the stump or other wood debris, the action of the grinding wheel gradually reduces the stump or wood debris to small wood chips or fine particles.

Stump grinders typically have the pivotal grinding arm and the grinding wheel arranged generally symmetrically with respect to the lateral width of the frame of the stump grinder. Thus, for an operator who is standing behind the frame or is carried on the frame on some type of seat or operator's platform, the grinding arm is usually disposed in a home position that is centered on the stump grinder frame and extends away from the operator in a straight fore-and-aft direction. The grinding arm traverses from side-to-side in generally equal arcs to either side of the home position. However, in this centered home position, the view of the operator with respect to the action of the grinding wheel on the stump or wood debris can be blocked or obstructed by the structure of the grinding arm itself. In other words, the operator may not be able to clearly see the contact area between the grinding wheel and the stump or wood debris.

In addition, the task of operating the stump grinder can involve multiple controls that can be difficult or at least confusing for the operator to use. There must be a set of traction and steering controls for the operator to use to control the forward and reverse motion of the stump grinder frame and to steer or turn the stump grinder frame. In addition, there must be other grinding arm controls to allow the operator to manipulate the grinding arm to cause the grinding arm to pivot up and down and to traverse from side-to-side out of the centered home position. There must also be an on-off grinding control to start or stop the rotation of the grinding wheel on the grinding arm.

Typically, the grinding arm controls often take the form of multiple levers. One lever controls the up and down motion of the grinding arm. Another lever controls the side-to-side traverse. The on-off grinding control often comprises yet another separate control, i.e. a separate on-off switch. Needless to say, it is not an easy task for the operator, particularly an unskilled operator who might rent a stump grinder from a rental business and is thus somewhat unfamiliar with the controls, to coordinate and properly use all of the multiple controls typically found on a stump grinder.

Finally, it should be apparent that the grinding wheel of a stump grinder should be reliably and durably driven in a cost-effective and simple manner. Mechanical drive systems, such as belt or chain drives, are prone to breaking given the forces involved in stump grinding and are costly and time consuming to maintain and to keep properly adjusted. Hydraulic motors carried on the grinding arm have been used to directly drive or rotate the grinding wheel without the interposition of belt or chain drives. However, the high forces involved in grinding that are transmitted to the shaft of such a hydraulic motor often exert large loads on the motor, leading to premature wear and failure of the motor. Given the relatively high cost of such hydraulic motors, this is a disadvantage of known designs in which hydraulic motors have been used to directly drive the grinding wheels.

SUMMARY OF THE INVENTION

One aspect of this invention relates to a stump grinder which comprises a frame that is supported for movement over the ground, the frame having a width between a left side and a right side thereof. A rotatable grinding wheel rotates about a substantially horizontal wheel axis for grinding or comminuting stumps or wood debris. A grinding arm comprises a rear section that is pivotally journalled to the frame for up and down pivoting about a substantially horizontal pivot axis, the rear section of the grinding arm being located substantially proximate to and along one side of the frame such that the rear section of the grinding arm is laterally offset relative to the frame. The grinding arm also has a front section that carries the rotatable grinding wheel. The front section is pivotally journalled to the rear section of the grinding arm for side-to-side pivoting about a substantially vertical pivot axis. The front section of the grinding arm has a position in which the front section of the grinding arm is longitudinally aligned in a fore-and-aft direction with the rear section of the grinding arm to be located with the rear section substantially proximate to and along the one side of the frame. The front section is pivotal about the vertical pivot axis out of the aligned position to traverse in a sideways direction across a substantial portion of the entire width of the frame with the rear section of the grinding arm remaining in place substantially proximate to and along the one side of the frame to allow the operator to better view, in a manner that is unobstructed by the rear section, the operation of the grinding wheel carried on the front section of the grinding arm.

Another aspect of this invention relates to a stump grinder which comprises a frame that is supported for movement over the ground. A rotatable grinding wheel rotates about a substantially horizontal wheel axis for grinding or comminuting stumps or wood debris. A grinding arm is movable relative to the frame with the grinding arm mounting the grinding wheel. The grinding arm has a pair of spaced side walls between which the grinding wheel is rotatably journalled. A motor is secured to one side wall of the grinding arm, the motor having a drive shaft that extends inwardly and that has a drive connection to the grinding wheel such that rotation of the drive shaft of the motor rotates the grinding wheel about the horizontal axis of rotation thereof. The motor has a pair of radial bearings for directly supporting the drive shaft of the motor and thus for indirectly supporting the grinding wheel from one side of the grinding wheel. A stub shaft is operatively secured to an opposite face of the grinding wheel. A third radial bearing is secured to an opposite side wall of the grinding arm for receiving the stub shaft, the stub shaft and third bearing additionally supporting the grinding wheel from an opposite side of the grinding wheel.

Yet another aspect of this invention relates to a stump grinder which comprises a frame that is supported for movement over the ground. A rotatable grinding wheel is provided that rotates about a substantially horizontal wheel axis for grinding or comminuting stumps or wood debris. A grinding arm is movable relative to the frame and mounts the grinding wheel. The grinding arm is pivotal about substantially horizontal and vertical axes to cause the grinding arm to pivot up and down about the horizontal axis and from side-to-side about the vertical axis. A single joystick controls the up and down and side-to-side pivoting of the grinding arm. The joystick is carried on the frame for manipulation by an operator along first and second orthogonal axes that are correlated to desired directions of pivoting of the grinding arm, the joystick being pulled rearwardly out of a neutral position in a fore-and-aft direction to lift the grinding arm, being pushed forwardly out of a neutral position in a fore-and-aft direction to lower the grinding arm, being pulled to the right out of a neutral position in a side-to-side direction to swing the grinding arm to the right, and being pulled to the left out of a neutral position in a side-to-side direction to swing the grinding arm to the left.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
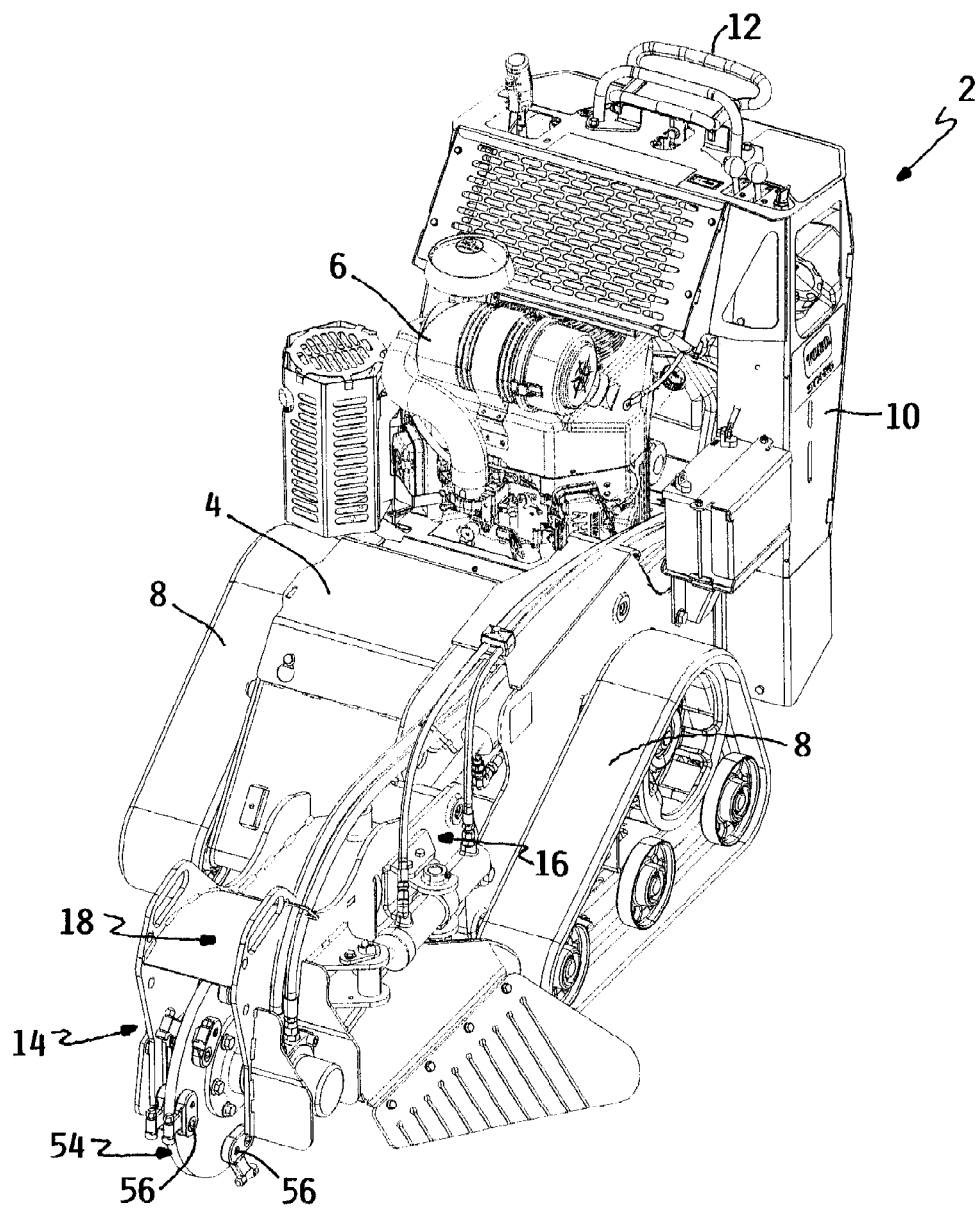
FIG. 1 is a perspective view of a stump grinder according to this invention.

Referring first to FIG. 1, one embodiment of a stump grinder according to this invention is generally illustrated as 2. Stump grinder 2 comprises a traction frame 4 that carries a power source 6, such as an internal combustion engine, that provides the power for propelling frame 4 over the ground. The propulsion means can take different forms, but in the illustrative embodiment shown in FIG. 1 comprises a pair of elongated, ground engaging tracks 8. A single such track 8 is located adjacent and immediately outboard of each of the opposite left and right sides of frame 4.

Frame 4 has an upwardly extending portion 10 at the rear thereof behind which an operator may walk on the ground as frame 4 is propelled over the ground. The top of rear portion 10 of frame 4 carries various controls that may be comfortably gripped by the operator as the operator stands behind frame 4. Among these controls is a traction and steering control indicated generally as 12. When power source 6 is in operation, the operator may manipulate traction and steering control 12 to cause a drive system (not shown) carried on frame 4 to drive ground engaging tracks 8 in forward or reverse at desired speeds with steering being accomplished through driving tracks 8 differentially at different speeds. The tracked frame 4 illustrated herein as well as the traction and steering control 12 are of the type shown in U.S. Pat. Nos. 6,460,640 and 6,709,223, which are assigned to the assignee of this invention and which are hereby incorporated by reference.

A grinding arm 14 is mounted on the front of frame 4 in a laterally offset position in which grinding arm 14 extends forwardly along the left side of frame 4 with grinding arm 14 overlying the left side of frame 4. Grinding arm 14 comprises two sections thereof, namely a rear section 16 and a front section 18. Rear section 16 of grinding arm 14 pivots on frame 4 about a lateral, substantially horizontal pivot axis x such that the entire grinding arm 14, i.e. both the rear and front sections 16 and 18 thereof, can swing or pitch downwardly or upwardly towards or away from the ground as indicated by the arrows A and B in FIG. 3. Pivot axis x is located very low on frame 4 at a distance that is only a few inches above the rotational axis of the front drive pulley or sprocket on track 8. Front section 18 of grinding arm 14 pivots relative to rear section 16 about a substantially vertical pivot axis y to swing or pivot front section 18 from side-to-side as indicated by the arrows C and D in FIGS. 2 and 3.

Figure 3:
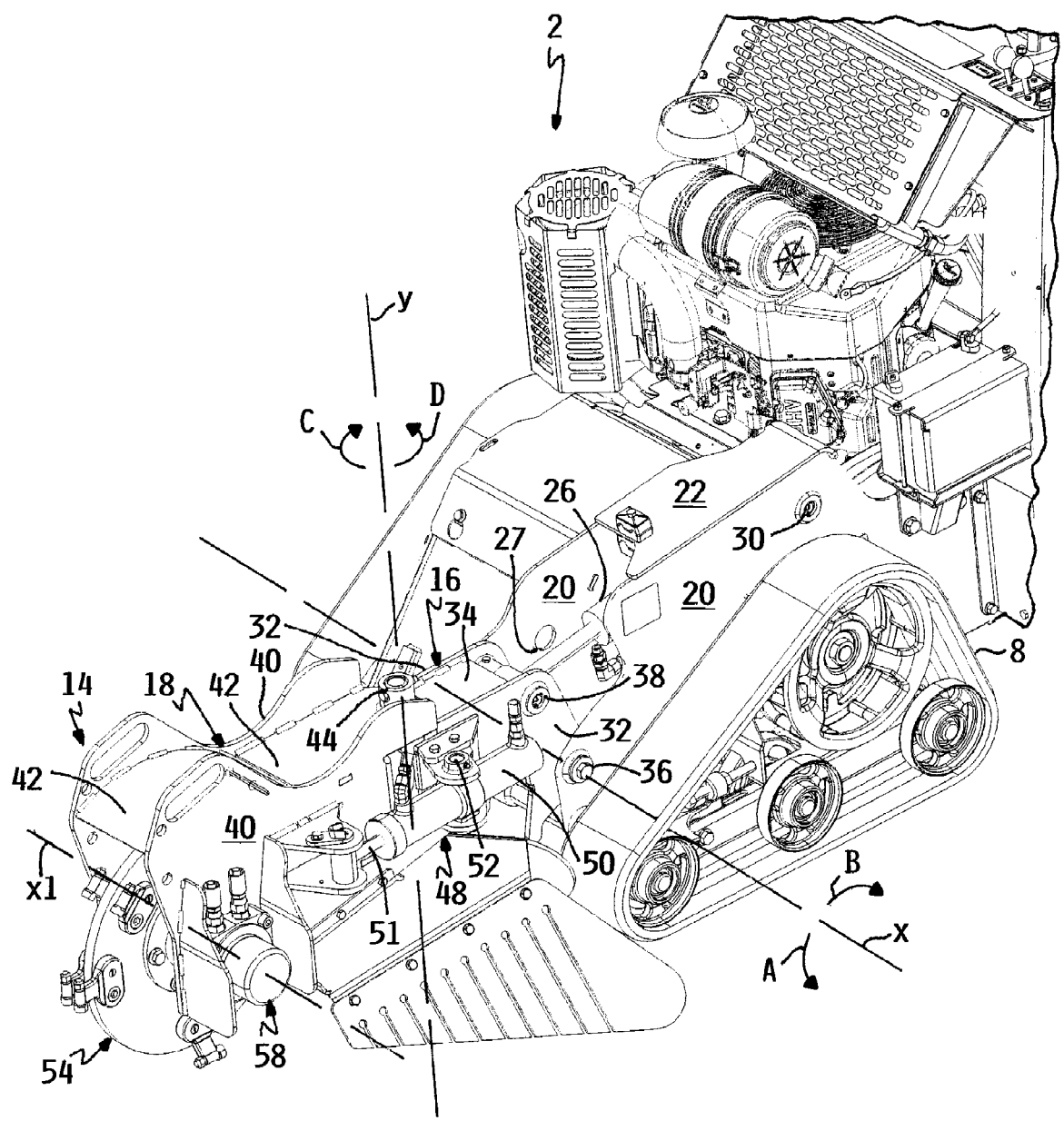
FIG. 3 is a partial perspective view of the stump grinder of FIG. 1, particularly illustrating the left side of the forwardly extending grinding arm.
Figure 4:
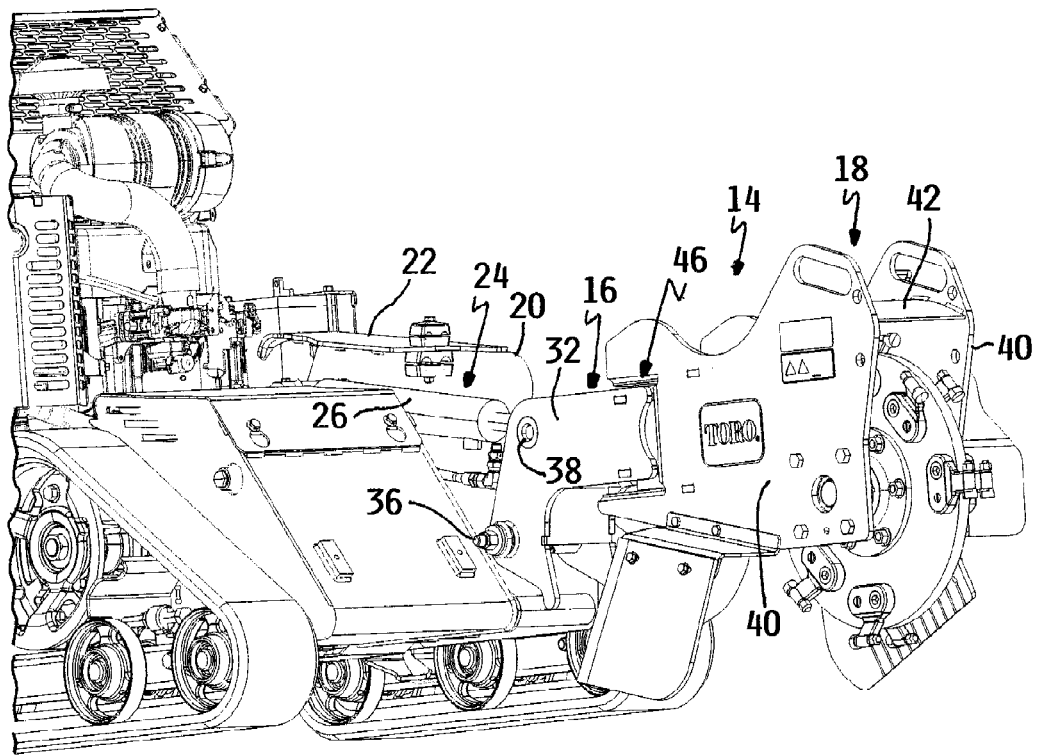
FIG. 4 is a perspective view similar to FIG. 3, but illustrating the right side of the forwardly extending grinding arm.

Referring to FIGS. 3 and 4, frame 4 includes a pair of laterally spaced, forwardly extending support walls 20 having at least lower portions thereof that extend forwardly to a front end of frame 4. A top wall 22 joins and connects support walls 20 together over rear portions of support walls 20. Note that in FIG. 4 the inner support wall 20 has been removed to illustrate a first hydraulic actuator 24 that is located between support walls 20 and beneath top wall 22. The cylinder 26 of first hydraulic actuator 24 is pivotally connected to the rear of support walls 20 by a pivot pin 30.

Rear section 16 of grinding arm 14 also includes a pair of side walls 32 that are joined or connected together by a top wall 34. Side walls 32 of rear section 16 have a slightly narrower spacing than the spacing of support walls 20 of frame 4 such that rear ends of side walls 32 of rear section 16 nest between support walls 20 of frame 4. Side walls 32 of rear section 16 are generally L-shaped with one leg of the L-shape extending downwardly to pivotally journal rear section 16 of grinding arm 14, and thus the entire grinding arm 14, on a pivot pin 36 that is carried between support walls 20 and that forms the horizontal pivot axis x for grinding arm 14. The rod 27 of first hydraulic actuator 24 pivotally connects to the rear ends of side walls 32 of rear section 16 at a pivot pin 38 close to the juncture of the legs of the L-shape and above the pivot pin 36 forming the pivot axis x. Thus, retraction of rod 27 into cylinder 26 of first hydraulic actuator 24 causes upward pivoting of grinding arm 14 in the direction of arrow B and extension of rod 27 out of cylinder 26 causes downward pivoting of grinding arm 14 in the direction of arrow A.

Front section 18 of grinding arm 14 is generally similar in structure to that of rear section 16 in the sense that front section 18 also comprises a pair of laterally spaced side walls 40 that are joined or connected together by a top wall 42. Side walls 40 of front section 18 are laterally spaced apart by a greater distance than side walls 32 of rear section 16 to allow the rear of front section 18 to telescopically nest over and around the front of rear section 16. A vertical pivot structure 44 forming the vertical pivot axis y pivotally joins the front and rear sections 18 and 16 together with side walls 40 of front section 18 having U-shaped cutouts 46 to allow front section 18 to swing or pivot around the front of rear section 16 without interference between the two.

As shown in FIG. 3, a second hydraulic actuator 48 has a cylinder 50 that is pivotally mounted by a pivot pin 52 to the exterior of one of side walls 32 of rear section 16. Rod 51 of second hydraulic actuator 48 is pivotally connected to an exterior of one of side walls 40 of front section 18 of grinding arm 14. Extension and retraction of rod 51 of second hydraulic actuator 48 causes front section 18 of grinding arm 14 to swing or pivot about the vertical pivot axis y relative to rear section 16 of grinding arm 14.

FIGS. 1-4 illustrate grinding arm 14 in a home position in which grinding arm 14 is substantially horizontal and with grinding arm 14 being longitudinally aligned with rear section 16 of grinding arm 14 with grinding arm 14 extending straight ahead in a longitudinal fore-and-aft direction. From this home position, grinding arm 14 can pivot or pitch downwardly in the direction of arrow A in FIG. 3 approximately 28° and can pivot or pitch upwardly in the direction of arrow B in FIG. 3 approximately 52°, for a total of approximately 80° of swing about the horizontal pivot axis x. From this home position, front section 18 of grinding arm 14 can pivot to the left in the direction of arrow C in FIG. 3 approximately 80° and can pivot to the right in the direction of arrow D in FIG. 3 approximately 20°, for a total of approximately 100° of swing about the vertical pivot axis y. Clearly, front section 18 of grinding arm 14 has an asymmetric swing angle in which it swings approximately four times further to the right than it does to the left (i.e. 80° to the right versus 20° to the left).

Front section 18 of grinding arm 14 has a front end that houses a rotatable grinding wheel 54. Grinding wheel 54 is in the form of a substantially flat, planar disc that has a plurality of stump or wood grinding tools 56 attached to the periphery thereof at circumferentially spaced locations. The nature of the wood grinding tools 56 that are used is not important to this invention and may be of any type that is known in the stump grinder art. Grinding wheel 54 is rotatably journalled on grinding arm 14 for rotation about a lateral, substantially horizontal, grinding axis xl. See FIG. 3.

Figure 5:
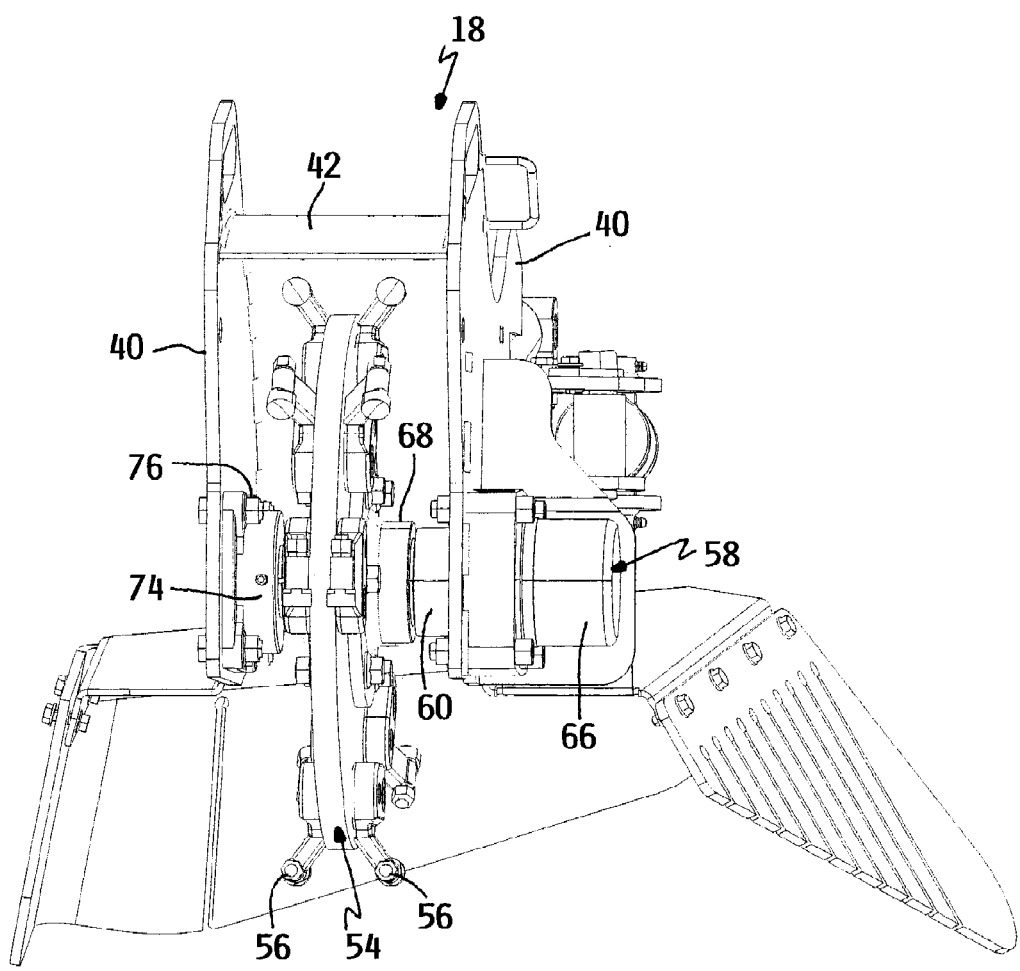
FIG. 5 is a perspective view of the front of the grinding arm of the stump grinder of FIG. 1, particularly illustrating the third bearing and drive motor that support the grinding wheel from opposite sides thereof.
Figure 6:
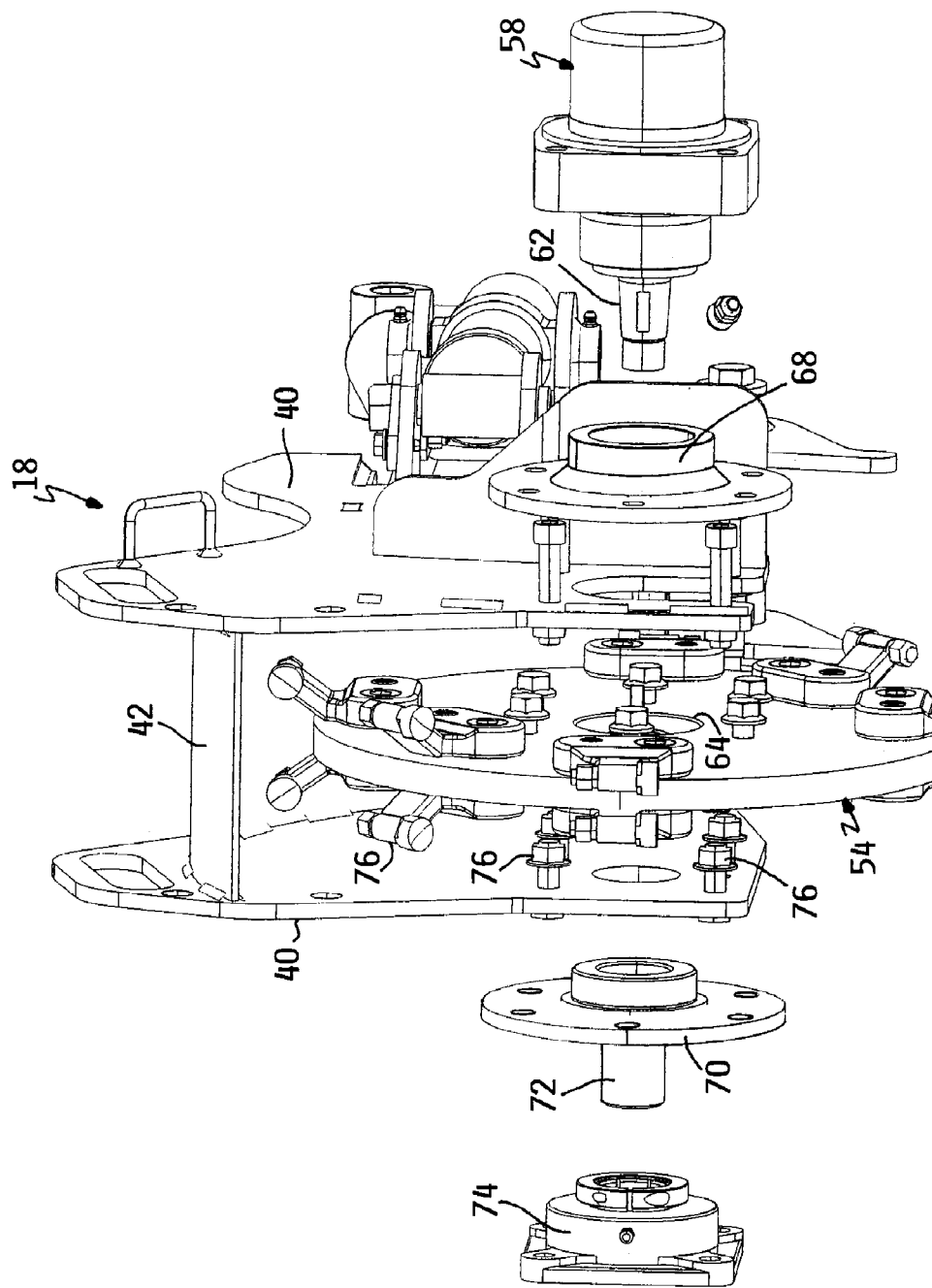
FIG. 6 is a perspective view similar to FIG. 5, but with the third bearing, stub shaft support hub, drive hub and drive motor for the grinding wheel being shown in exploded form for the sake of clarity.

As shown in FIGS. 5 and 6, grinding wheel 54 is mounted to front section 18 of grinding arm 14 and is powered by a hydraulic motor 58 in a simple and durable manner. Motor 58 is bolted to an exterior of one of side walls 40 of front section 18. Motor 58 has an inner portion 60 extending through side wall 40 to be positioned relatively close to one side face of grinding wheel 54. Motor 58 has an inwardly projecting drive shaft 62 that sticks further inwardly from the inner portion of motor 58 such that drive shaft 62 extends into, but not through, a central bore 64 in grinding wheel 54. FIG. 6 depicts central bore 64. Motor 58 includes a pair of radial bearings (not shown) within the housing thereof that rotatably journal and support drive shaft 62 of motor 58 against radial loads on drive shaft 62. Motor 58 is preferably a TJ Series Motor manufactured by the Hydraulic Pump/Motor Division of Parker Hannifin Corporation.

One face of grinding wheel 54 has a drive hub 68 bolted thereto. The interior of drive hub 68 has a keyed, splined, or tapered drive connection (not shown) to drive shaft 62 of motor 58. Thus, as motor 58 is rotated by hydraulic fluid flow therethrough, the rotation of drive shaft 62 will be transferred through drive hub 58 to grinding wheel 54 to rotate the same about its axis of rotation xl. The support of grinding wheel 54 could end there, as is conventional in the stump grinder art, with grinding wheel 54 simply being supported by motor 58 alone. However, the Applicants have found that this imposes undesirably high loads on motor 58 in many stump and wood grinding operations.

Thus, grinding wheel 54 of this invention is further supported on the other side or face thereof as well. A support hub 70 that carries an outwardly extending stub shaft 72 is bolted to the opposite side face of grinding wheel 54. See FIG. 7. A third radial bearing 74, namely a stub shaft bearing, is then bolted to the inside of the opposite side wall 40 of front section 18 of grinding arm 14. Third bearing 74 rotatably journals and supports stub shaft 72 to support the opposite side of grinding wheel 54. Thus, going from right to left in FIG. 5, there are three radial bearings that carry the radial loads from grinding wheel 54, i.e. a first drive shaft radial bearing inside motor 58, a second drive shaft radial bearing inside motor 58 with both drive shaft bearings being on one side of grinding wheel 54, and a third stub shaft radial bearing 74 on the opposite side of grinding wheel 54. This allows a hydraulic motor 58 to be simply and inexpensively bolted to one side wall 40 of front section 18 of grinding arm 14 but, with the use of stub shaft bearing 74, still provides radial bearing support on both sides of grinding wheel 54. Enough vertical slop or play is desirably provided between the bolts 76 and the holes that are used to bolt stub shaft bearing 74 in place such that the vertical position of stub shaft bearing 74 on side wall 40 can be shifted up and down as need be before stub shaft bearing 74 is firmly tightened into place to allow alignment of stub shaft 72 with drive shaft 62.

Figure 2:
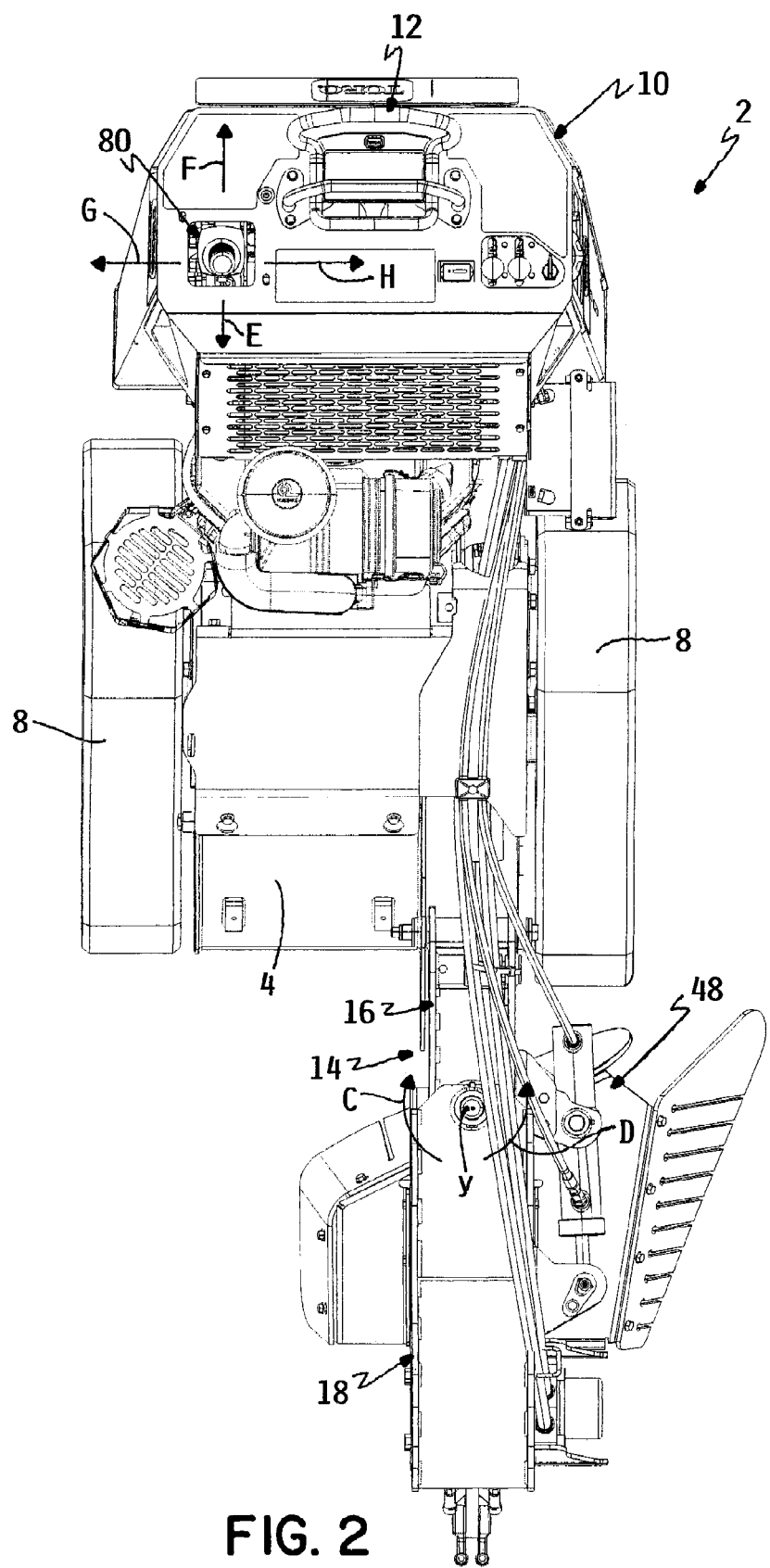
FIG. 2 is a top plan view of the stump grinder of FIG. 1.
Figure 7:
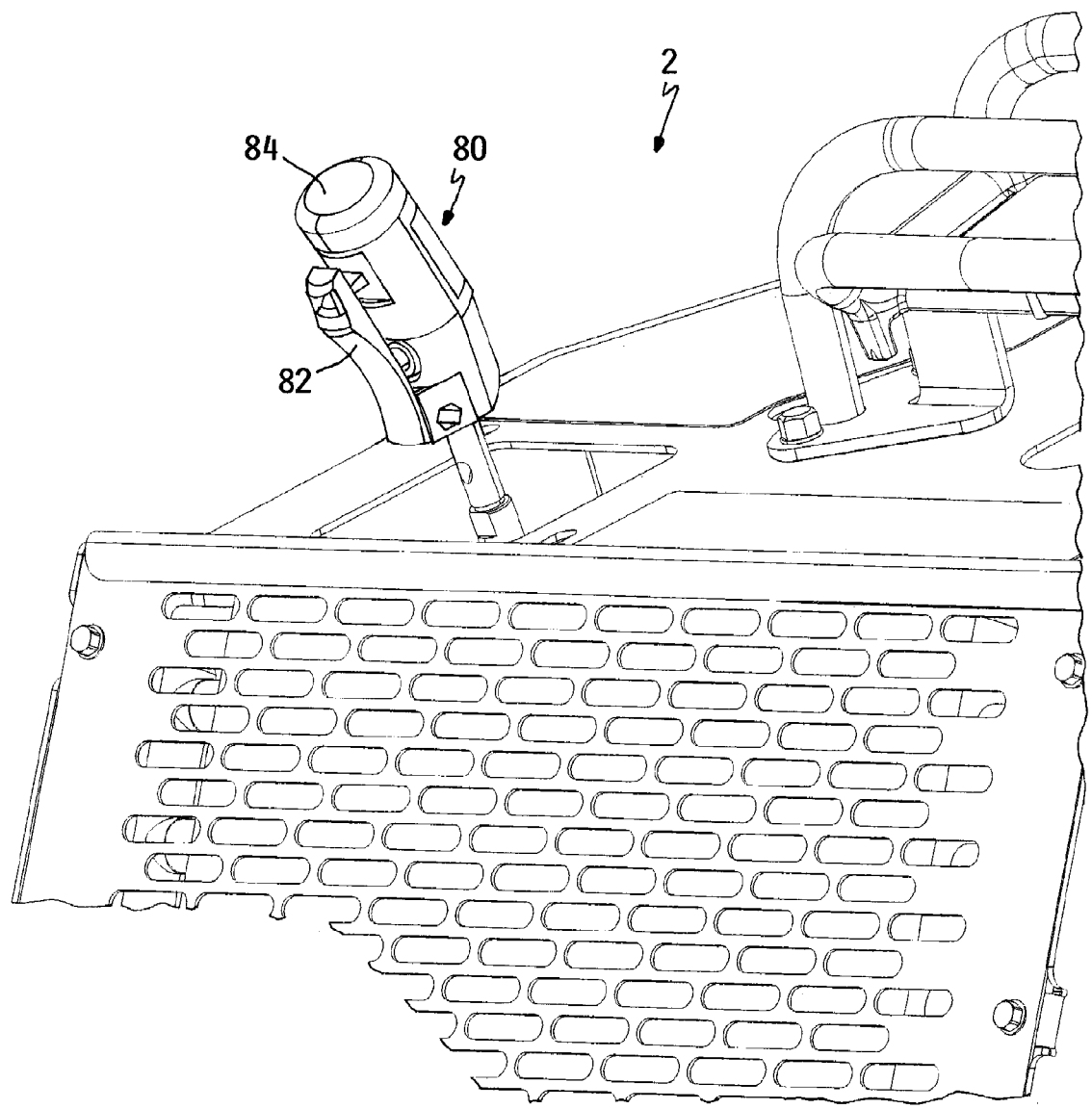
FIG. 7 is a partial perspective view of the stump grinder of FIG. 1, particularly illustrating the single joystick control for operating the grinding arm and the grinding wheel.

Referring now to FIGS. 2 and 7, stump grinder 2 of this invention includes a joystick 80 for simple and intuitive operation of grinding arm 14 and grinding wheel 54. Joystick 80 has a centered neutral position as is typical of joysticks, which neutral joystick position corresponds to the home position of grinding arm 14. Joystick 80 is pivotally mounted in any suitable manner in frame 4 for movement in a longitudinal fore-and-aft direction as indicated by the arrows E and F in FIG. 2. This longitudinal motion of joystick 80 will control first hydraulic actuator 24 to cause grinding arm 14 to pivot up in the direction of the arrow B when joystick 80 is pulled back in the direction of arrow F and to cause grinding arm 14 to pivot down in the direction of the arrow A when joystick 80 is pushed forwardly in the direction of arrow E. The pivotal mounting of joystick 80 also permits movement of joystick 80 in a lateral side-to-side direction as indicated by the arrows G and H in FIG. 2. This lateral motion of joystick 80 will control second hydraulic actuator 48 to cause front section 18 of grinding arm 14 to swing from side-to-side in a direction corresponding to the direction of joystick 80, front section 18 swinging in the direction of the arrow C when joystick 80 swings in the direction of the arrow G and in the direction of the arrow D when joystick 80 swings in the direction of the arrow H.

Thus, the user need only operate a single control, namely joystick 80, and need move that control only in a direction corresponding to the up and down and side-to-side pivoting that is desired for grinding arm 14. This greatly eases the task of operating grinding arm 14, especially for a new or relatively unskilled operator, since the operator need not grip and coordinate the operation of separate control levers. All the operator need use is the single joystick 80.

To further ease the task of operating stump grinder 2, joystick 80 can be provided with a compressible trigger 82 on the front side thereof that controls the on-off operation of grinding wheel 54. In order to start grinding wheel 54, the operator need only press a button 84 on top of joystick 80 and then squeeze trigger 82 rearwardly until the top of trigger 82 abuts against joystick 80. A switch (not shown) will be closed by trigger 82 and grinding wheel 54 will start rotating. Once trigger 82 is closed, the operator can release button 84 on top of joystick 80. To stop grinding wheel 54, the operator need only release trigger 82, which causes trigger 82 to pivot back forwardly away from joystick 80 under the bias of a spring (not shown), to stop the rotation of grinding wheel 54. Integrating the on-off control for grinding wheel 54 on the same joystick 80 that controls the up and down pitching of grinding arm 14 and the side-to-side traverse of grinding wheel 54 further simplifies the task of operating stump grinder 2.

The offset nature of grinding arm 14 provides better visibility to the operator during a stump grinding operation. Of course, during such an operation, the operator will wear eye protection to protect his or her eyes from wood chips or other debris being generated by stump grinder 2. But, grinding wheel 54 can now traverse or swing from the extreme left side of frame 4 in a large arc extending in front of frame 4 and across substantially the entire width of frame 4 without being obstructed by rear section 16 of grinding arm 14, which remains in place on the left side of frame 4 out of the line of vision of the operator. This allows the operator to better see and place grinding wheel 54 at a desired location on the stump or other debris that is being ground down.

Various modifications of this invention will be apparent to those skilled in the art. Thus, the scope of this invention is to be limited only by the appended claims.

We claim:

1. A stump grinder, which comprises:
    (a) a frame that is supported for movement over the ground, the frame having a traction drive system for self-propelling the frame over the ground;
    (b) a rotatable grinding wheel that rotates about a substantially horizontal axis for grinding or comminuting stumps or wood debris;
    (c) a grinding arm that mounts to the grinding wheel, wherein the grinding arm is carried by the frame and is movable relative to the frame to cause the grinding wheel to lift and lower and to move left and right relative to the frame;
    (d) at least one power source carried by the frame for powering the traction drive system, for moving the grinding arm, and for rotating the grinding wheel; and
    (e) wherein the frame has a rear end which carries various hand operated controls for operating the traction drive system and for moving the grinding arm relative to the frame, wherein the rear end of the frame has a rearwardly facing back end which is substantially unobstructed from behind, and wherein the controls are located on the rear end of the frame substantially proximate to the back end.

2. The stump grinder of claim 1, wherein the controls are laterally spaced apart relative to one another across the rear end of the frame.

3. The stump grinder of claim 1, wherein the at least one power source comprises a single power source.

4. The stump grinder of claim 3, wherein the single power source is mounted on the frame rearward of the grinding arm.

5. The stump grinder of claim 1, wherein the grinding arm is laterally offset relative to a fore-and-aft centerline of the frame.

6. The stump grinder of claim 1, wherein one of the controls includes a depressible trigger that can be squeezed against the one control to start the rotation of the grinding wheel, and wherein the rotation of the grinding wheel is stopped when the trigger is released.

7. The stump grinder of claim 6, wherein the one control further has a depressible button that must be pressed before the depressible trigger is squeezed against the one control in order to start the rotation of the grinding wheel.

8. The stump grinder of claim 7, wherein the button is configured to be released after the grinding wheel has started its rotation without such release stopping the rotation of the grinding wheel for so long as the depressible trigger remains squeezed against the one control.

9. The stump grinder of claim 6, wherein the one control causes motion of the grinding arm relative to the frame.

10. A stump grinder, which comprises:
    (a) a frame that is supported for movement over the ground, the frame having a traction drive system for self-propelling the frame over the ground;
    (b) a rotatable grinding wheel that rotates about a substantially horizontal axis for grinding or comminuting stumps or wood debris;
    (c) a grinding arm that mounts to the grinding wheel, wherein the grinding arm is carried by the frame and is movable relative to the frame to cause the grinding wheel to lift and lower and to move left and right relative to the frame;
    (d) at least one power source carried by the frame for powering the traction drive system, for moving the grinding arm, and for rotating the grinding wheel; and
    (e) wherein the frame carries various hand operated controls for operating the traction drive system and for moving the grinding arm relative to the frame, wherein one of the controls includes a depressible trigger that can be squeezed against the one control to start the rotation of the grinding wheel, and wherein the rotation of the grinding wheel is stopped when the trigger is released.

11. The stump grinder of claim 10, wherein the one control further has a depressible button that must be pressed before the depressible trigger is squeezed against the one control in order to start the rotation of the grinding wheel.

12. The stump grinder of claim 11, wherein the button is configured to be released after the grinding wheel has started its rotation without such release stopping the rotation of the grinding wheel for so long as the depressible trigger remains squeezed against the one control.

13. The stump grinder of claim 10, wherein the one control causes motion of the grinding arm relative to the frame.

* * * * *